United States Patent Office 3,439,020
Patented Apr. 15, 1969

3,439,020
PROCESS FOR PURIFYING BIS(β-HYDROXY-ETHYL) TEREPHTHALATE AND ISOPHTHALATE
Michitoshi Kitabatake, Masatomo Ito, Takashi Ikeda, Noriyoshi Aozuka, and Yoshitaka Noguchi, Tokyo, Japan, assignors to Showa Denko Kabushiki Kaisha, Tokyo, Japan, a corporation of Japan
No Drawing. Filed July 19, 1966, Ser. No. 566,219
Claims priority, application Japan, July 26, 1965,
40/44,822
Int. Cl. C07c 69/80, 69/82
U.S. Cl. 260—475                    6 Claims

ABSTRACT OF THE DISCLOSURE

This invention relates to a process for purifying bis(beta-hydroxyethyl) terephthalate or bis(beta-hydroxyethyl) isophthalate which has been prepared by reacting terephthalonitrile or isophthalonitrile with ethylene glycol and water which comprises treating the crude ester with an aqueous solution of an acid having a pH of 1–5. The purified esters are used as intermediates for the production of films and fibers.

---

This invention relates to a process for purifying bis(β-hydroxyethyl) terephthalate or bis(β-hydroxyethyl) isophthalate, which have been prepared by reacting terephthalonitrile or isophthalonitrile with ethylene glycol and water.

The polycondensation product of bis(β-hydroxyethyl) terephthalate is an important intermediate for forming commercially valuable fiber- or film-forming polyethylene terephthalate. On the other hand, bis(β-hydroxyethyl) isophthalate is likewise a valuable intermediate, since by copolycondensing it with bis(β-hydroxyethyl) terephthalate a copolyester suitable for the production of fibers and films is obtained.

For preparing bis(β-hydroxyethyl) terephthalate or bis(β-hydroxyethyl) isophthalate favorably a method is known wherein terephthalonitrile or isophthalonitrile is reacted with ethylene glycol and water. The polyesters obtained by the polycondensation of the esters formed by this process have however the shortcoming that they are discolored to yellow or brown, or in extreme cases to even blackish brown. The chief cause is believed to be due to the use of the corresponding dicyanobenzenes, i.e., terephthalonitrile or isophthalonitrile, as the starting material for the preparation of said esters, in consequence of which nitrogen-containing impurities which are derived therefrom are inevitably formed, which becoming admixed in the product gives rise to such discolorations. For avoiding this discoloration of the polyester various methods have been known.

Techniques which are customary in the art include the application of such purification means to either the crude bis(β-hydroxyethyl) terephthalate or bis(β-hydroxyethyl) isophthalate as recrystallization from water, active carbon treatment of the aqueous solution of the ester and extraction of the impurities with an organic solvent, such as chloroform; or the addition of a coloration inhibitor, say, of the derivative of phosphoric acid or the derivative of sulfur type, during the preparation of the ester from terephthalonitrile or isophthalonitrile, ethylene glycol and water; or the addition of a coloration inhibitor such as triphenyl phosphate during the polycondensation step of the ester. It is however not a simple matter to obtain by any of these techniques polyesters of such small discoloration as to qualify as starting materials for the production of textile fibers. For purpose of information, results obtained when experiments were conducted according to the foregoing conventional methods are presented below.

The average molecular weight and degree of coloration of polyesters obtained by processes consisting of using bis(β-hydroxyethyl) terephthalate (BHET) prepared from terephthalonitrile, ethylene glycol and water in the presence of a lead oxide catalyst and purifying the same by such procedures as recrystallization from water twice, treatment of an aqueous solution thereof with active carbon or extraction with chloroform, followed by the polycondensation reaction of the so obtained ester, and by the process of adding triphenyl phosphate during the polycondensation reaction are shown in the following table. By way of comparison, also shown are the intrinsic viscosity and degree of coloration of polyethylene terephthalate obtained by the polycondensation reaction of bis(β-hydroxyethyl) terephthalate prepared by the transesterification of dimethyl terephthalate (DMT) with ethylene glycol. The intrinsic viscosity $[\eta]$ was measured in a 1:1 solvent mixture of tetrachloroethane and phenol at 25° C.

TABLE

| Material and treatment procedure | Polyethylene terephthalate | |
|---|---|---|
| | Intrinsic viscosity $[\eta]$ | Degree of coloration |
| Crude BHET (control) | 0.68 | 6 |
| Recrystallization from water | 0.75 | 5 |
| Active carbon treatment | 0.77 | 4 |
| Chloroform extraction | 0.72 | 4 |
| Addition of triphenyl phosphate | 0.76 | [1] 3 |
| BHET from DMT | 0.753 | [2] 1–2 |

[1] Active carbon treated BHET used.
[2] The degree of coloration was 1 in the case where triphenyl phosphate was added.
NOTE.—Degree of coloration: 1=white, 2=very light yellow, 3=light yellow, 4=yellow, 5=yellowish brown, 6=brown.

The conditions of the polycondensation experiment were as follows:

BHET used in the polycondensation: 20 grams.
Polycondensation catalyst: antimony oxide, 0.005 mol percent of BHET.
Reaction temperature, pressure and time: 280° C./0.5–1 mm. Hg/4.5 hrs.

As a result of our researches, we found that pure white polyesters suitable for the production of fibers and films could be obtained by polycondensing or copolycondensing purified bis(β-hydroxyethyl) terephthalate or bis(β-hydroxyethyl) isophthalate which have been obtained by treating with an acidic aqueous solution the crude bis(β-hydroxyethyl) terephthalate or isophthalate which has been prepared by reacting terephthalonitrile of isophthalonitrile with ethylene glycol and water.

The acid to be used is not critical as long as it is colorless in itself. The acidic aqueous solution functions most effectively at pH 1–5. Although the reasons why the treatment effects are manifested by an acidic aqueous solution is not as yet exactly clear, it is presumed that the nitrogen-containing base (e.g. a substance similar to the intended product and containing amino or imino group or Schiff base) derived from either the material nitrile or the ammonia formed as the reaction proceeds reacts with the acid to form a salt and becomes water-soluble, and hence is removed by extraction from the bis(β-hydroxyethly) terephthalate or bis(β-hydroxyethyl) isophthalate.

The present invention comprises treating with an acidic aqueous solution crude bis(β-hydroxyethyl) terephthalate or bis(β-hydroxyethyl) isophthalate, which has been obtained by the reaction of terephthalonitrile or isophthalonitrile with ethylene glycol and water, separating the crystals of said esters from said acidic aqueous solution, and thereafter washing the separated crystals with water until the washing liquid does not exhibit any indication of acidity. The mode of treatment with an acidic aqueous solution includes the recrystallization and washing techniques.

The acid to be used in this invention is, as previously indicated, one which is colorless in itself. Further, it preferably should be one which readily dissolves in water when cold. Acids of this kind are exemplified by the mineral acids such as hydrochloric, nitric, sulfuric, phosphoric and carbonic acids, and the organic acids such as formic, acetic, monochloroacetic, propionic, oxalic, succinic, malic and citric acids, particularly preferred being hydrochloric acid, phosphoric acid and acetic acid. Further, there is no particular restriction as to the temperature of treatment by means of this acidic aqueous solution so long as it is not such as to bring about the hydrolysis of the ester. The dissolving temperature employed in the recrystallization technique is conviniently 60–100° C. Further, the presence of ethylene glycol in the acidic aqueous solution is permissible.

For illustrating the invention process exemplified modes of its practice will be given below.

The purification process by means of recrystallization from an acidic aqueous solution comprises the steps of placing the crude ester in, say, 4–40 times amount by weight, based on said ester, of N/1000–N/10 dilute acidic aqueous solution, effecting the solution, therein by heating 5–30 minutes at 60–100° C., filtering off the insoluble matter while the solution is still hot, cooling the solution by allowing it to stand at room temperature, separating the deposited crystals by a suitable technique such as filtration or centrifuging, and thereafter washing with cold water, and preferably cold water of 0–5° C., until no indications of acidity is exhibited, using a suitable indicator such as bromothymol blue.

On the other hand, the purification process by means of washing with an acidic aqueous solution comprises the steps of suspending in a cold state (0–5° C.) the solid powder of the crude ester in, say, 4–40 times amount by weight, based on the ester, of N/1000–N/10 dilute acidic aqueous solution, vigorously stirring the mixture for 5–10 minutes, separating the ester powder from the acidic aqueous solution by a suitable technique such as decantation, filtration or centrifugation, and thereafter either effecting recrystallization from water once or washing with cold water to remove the acidity.

Further, the washing with the acidic aqueous solution can be repeated several times, if desired.

When the bis($\beta$-hydroxyethyl) terephthalate or bis($\beta$-hydroxyethyl) isophthalate purified by the invention method is polycondensed or copolycondensed at about 280° C. under high vacuum using the known polyester polycondensation catalysts, a polyester which is white, or nearly so, is obtained. This is highly suited for the production of fibers or films.

The following examples are given for further illustrating the invention.

EXAMPLE 1

Twenty-five grams of crude bis($\beta$-hydroxyethyl) terephthalate (M.P. 106–107° C.) obtained by reacting terephthalonitrile with ethylene glycol and water in the presence of lead oxide catalyst were placed in 100 cc. of N/10 hydrochloric acid and dissolved therein by heating for 5 minutes at 100° C., followed by filtering off the insoluble matter. The solution was then allowed to cool to room temperature, after which the deposited crystals were separated by filtration and washed with cold water until the yellow color with bromothymol blue indicator disappeared, followed by drying. The so obtained bis($\beta$-hydroxyethyl) terephthalate was white and its melting point was 110° C.

The polyethylene terephthalate obtained by the polycondensation reaction of this bis($\beta$-hydroxyethyl) terephthalate for 4.5 hours at 280° C. under a high vacuum of not more than 1 mm. Hg, using as catalyst antimony oxide, had an intrinsic viscosity [$\eta$] of 0.745 and its degree of coloration was 1 (white). The viscosity measurement was made by dissolving the polymer in a 50:50 (weight percent) solvent mixture of tetrachloroethane and phenol and measuring at 25° C. The viscosity value indicated hereinafter were also obtained by this method.

EXAMPLE 2

When the polycondensation reaction was carried out as in Example 1 but using purified bis($\beta$-hydroxyethyl) terephthalate obtained by conducting the recrystallization operation for 10 minutes at 70° C. instead of 5 minutes at 100° C., polyethylene terephthalate having an intrinsic viscosity [$\eta$] of 0.76 and a degree of coloration of 1 was obtained.

EXAMPLE 3

Twenty grams of the crude bis($\beta$-hydroxyethyl) terephthalate as used in Example 1 were placed in 500 cc. of N/100 hydrochloric acid and were dissolved therein by heating for 10 minutes at 80° C., after which the insoluble matter was filtered off while the solution was still hot, followed by allowing the solution to cool to room temperature. The deposited crystals were separated by filtration and then washed with cold water until the acidity disappeard as indicated by the bromothymol blue indicator, followed by drying.

The so obtained bis($\beta$-hydroxyethyl) terephthalate was poly-condensed for 4.5 hours at 280° C. under a vacuum of not more than 1 mm Hg using as catalyst antimony oxide to yield polyethylene terephthalate having an intrinsic viscosity [$\eta$] of 0.74 and a degree of coloration of 2 (very light yellow).

EXAMPLE 4

When the polycondensation reaction was carried out as in Example 3 but using purified bis($\beta$-hydroxyethyl) terephthalate obtained by conducting the recrystallization operation for 5 minutes at 100° C. instead of 10 minutes at 80° C., polyethylene terephthalate having an intrinsic viscosity [$\eta$] of 0.765 and a degree of coloration of 1 was obtained.

EXAMPLE 5

Five grams of crude bis($\beta$-hydroxyethyl) isophthalate (M.P. 74–76° C.) obtained by reacting isophthalonitrile with ethylene glycol and water by the addition as catalyst of lead oxide, and 20 grams of the crude bis($\beta$-hydroxyethyl) terephthalate as used in Example 1 were placed in 100 cc. of N/10 hydrochloric acid and dissolved therein by heating for 5 minutes at 100° C. After filtering off the insoluble matter while the solution was still hot the solution was allowed to cool to room temperature. The precipitated white crystals were separated by filtration and then washed with cold water until the acidity disappeared (bromothymol blue indicator), followed by drying. The mixture of bis($\beta$-hydroxyethyl) isophthalate and terephthalate which had been puprified in this manner was then polycondensed for 4.5 hours at 280° C. under a vacuum of not over 1 mm. Hg using as catalyst antimony oxide to yield a copolyester having an intrinsic viscosity [$\eta$] of 0.755 and a degree of coloration of 1.

On the other hand, the copolyester obtained by polymerizing under identical conditions a mixture of 5 grams of crude bis($\beta$-hydroxyethyl) isophthalate and 20 grams of crude bis($\beta$-hydroxyethyl) terephthalate, which had not received the purification treatment according to this invention, had an intrinsic viscosity [$\eta$] of 0.77 and a degree of coloration of 6 (brown).

EXAMPLE 6

Twenty-five grams of the crude bis($\beta$-hydroxyethyl) terephthalate as used in Example 1 were placed in 100 cc. of N/10 hydrochloric acid under ice cold conditions, followed by vigorous stirring for 10 minutes. Next, after allowing the solution to stand still, the supernatant liquid was removed by decantation, 100 cc. more of N/10 hydrochloric acid were added and vigorous stirring of the solution was carried out for another 10 minutes while cooling with ice. This was followed by suction filtration, collection of white crystals and recrystallization from a two to three-fold volume of water once. The melting point of the so obtained bis($\beta$-hydroxyethyl) terephthalate was 110° C.

When this bis($\beta$-hydroxyethyl) terephthalate was polycondensed under identical conditions as in Example 1, polyethylene terephthalate having an intrinsic viscosity [$\eta$] of 0.737 and a degree of coloration of 2 (very light yellow) was obtained.

EXAMPLE 7

Example 6 was repeated except that 200 cc. of carbonic acid N/10 aqueous solution were used in the atmosphere of carbon dioxide instead of hydrochloric acid, with the consequence the bis($\beta$-hydroxyethyl) terephthalate having a melting point of 108° C. was obtained. When this was polycondensed, a polyester having an intrinsic viscosity [$\eta$] of 0.73 and a degree of coloration of 2 was obtained.

EXAMPLES 8–16

Crude bis($\beta$-hydroxyethyl) benzene dicarboxylic acid esters obtained by reacting terephthalonitrile or isophthalonitrile with ethylene glycol and water were recrystallized under varying conditions using various acids. The operation was carried out as in Example 1. The class and quantities of the esters used, the class of acids used and the conditions under which the treatments were carried out, as well as the intrinsic viscosity and degree of coloration of the polyesters which were obtained by the polycondensation of the purified esters obtained by the recrystallization of the foregoing esters are summarized in the following table.

We claim:
1. A process for purifying crude bis($\beta$-hydroxyethyl) terephthalate and isophthalate which comprises the steps of:
  (a) recrystallizing from an aqueous solution of an acid having a pH 1–5 a crude bis($\beta$-hydroxyethyl) benzenedicarboxylic acid ester selected from the group consisting of bis($\beta$-hydroxyethyl) terephthalate and bis($\beta$-hydroxyethyl) isophthalate, said ester having been produced by the reaction of the corresponding dicyanobenzene with ethylene glycol and water; and
  (b) washing the recrystallized ester with water until the washing liquid exhibits no indications of acidity.
2. A process for purifying crude bis($\beta$-hydroxyethyl) terephthalate and isophthalate which comprises the steps of:
  (a) washing with an aqueous solution of an acid having a pH 1–5 a crude bis($\beta$-hydroxyethyl) benzenedicarboxylic acid ester selected from the group consisting of bis($\beta$-hydroxyethyl) terephthalate and bis($\beta$-hydroxyethyl) isophthalate, said ester having been produced by the reaction of the corresponding dicyanobenzene with ethylene glycol and water; and thereafter
  (b) washing said ester with water until the washing liquid exhibits no indications of acidity.
3. The process according to claim 1 wherein said acid is hydrochloric acid.
4. The process according to claim 1 wherein said acid is phosphoric acid.
5. The process according to claim 1 wherein said acid is acetic acid.
6. A process according to claim 2 wherein the acid is hydrochloric acid.

| Ex. | Crude esters | Quantities of esters used, (g.) | Acid-treatment conditions | | | | | Polyester | |
|---|---|---|---|---|---|---|---|---|---|
| | | | Acids used | Quantities of acids (cc.) | Concentration of acids | Treatment Temperature (° C.) | Treatment time (min.) | Intrinsic viscosity | Degree of coloration |
| 8 | Isophthalate | 5 | Nitric acid | 500 | N/100 | 70 | 10 | 0.715 | 3 |
| | terephthalate. | 20 | | | | | | | |
| 9 | Terephthalate | 25 | Sulfuric acid | 100 | N/100 | 70 | 15 | 0.785 | 3 |
| 10 | do | 20 | Phosphoric acid | 200 | N/10 | 70 | 10 | 0.75 | 1 |
| 11 | do | 25 | Formic acid | 200 | N/50 | 90 | 5 | 0.775 | 2 |
| 12 | do | 25 | Acetic acid | 100 | N/10 | 80 | 10 | 0.725 | 1 |
| 13 | do | 25 | Succinic acid | 100 | N/10 | 80 | 5 | 0.75 | 2 |
| 14 | do | 20 | Monochloroacetic acid | 300 | N/10 | 75 | 10 | 0.72 | 1 |
| 15 | do | 20 | Propionic acid | 200 | N/50 | 80 | 15 | 0.71 | 2 |
| 16 | do | 20 | Oxalic acid | 500 | N/50 | 90 | 10 | 0.715 | 1 |

References Cited

UNITED STATES PATENTS 3,313,844    4/1967    Matsuhisa et al. _____ 260—472

JAMES A. PATTEN, *Primary Examiner.*

E. J. SKELLY, *Assistant Examiner.*

U.S. Cl. X.R.

260—75